United States Patent

[11] 3,599,061

[72] Inventor Richard A. Kokosa
Skaneateles, N.Y.
[21] Appl. No. 862,202
[22] Filed Sept. 30, 1969
[45] Patented Aug. 10, 1971
[73] Assignee The United States of America

[54] SCR EMITTER SHORT PATTERNS
1 Claim, 2 Drawing Figs.

[52] U.S. Cl. 317/235 R, 317/234 R, 317/234 N, 317/235 AB, 317/235 AE
[51] Int. Cl. H01l 11/00, H01l 13/00
[50] Field of Search 317/234, 235, 44

[56] References Cited
UNITED STATES PATENTS

| | | | |
|---|---|---|---|
| 3,277,352 | 10/1966 | Hubner | 317/234 |
| 3,280,392 | 10/1966 | Bender | 317/235 |
| 3,337,782 | 8/1967 | Todaro | 317/235 |
| 3,475,235 | 10/1969 | Nowalk et al. | 148/190 |
| 3,239,728 | 3/1966 | Aldrich et al. | 317/235 |
| 3,476,992 | 11/1969 | Chu | 317/235 |

*Primary Examiner*—John W. Huckert
*Assistant Examiner*—B. Estrin
*Attorneys*—John W. Pease, Joseph C. Warfield and John F. Miller

ABSTRACT: An improved pattern of shorting elements is provided for a controlled rectifier.

Richard A. Kokosa
INVENTOR.
BY John F. Miller
Agent
John M. Pease
Attorney

SCR EMITTER SHORT PATTERNS

BACKGROUND OF THE INVENTION

The invention is in the field of semiconductors. In the prior art, shorting elements shorting the junction between the emitter and base regions of a controlled rectifier have been disposed in a rectangular pattern which necessitated the elimination of a number of shorting elements with a consequent loss of effectiveness. This invention solves the problem of loss of effectiveness by arranging shorting elements in an improved pattern.

SUMMARY OF THE INVENTION

Emitter shorts in a silicon controlled rectifier are arranged in a circular pattern to conform to the circular symmetry of the emitter.

DESCRIPTION OF THE PREFERRED EMBODIMENT

Figure 1:
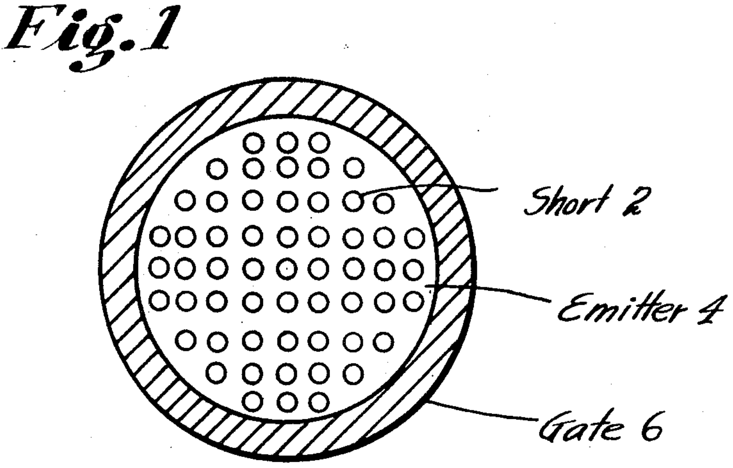
FIG. 1 shows a prior art arrangement of shorts in the emitter contact of a controlled rectifier.

FIG. 1 shows a rectangular pattern of emitter shorts in the emitter of a conventional SCR (silicon controlled rectifier). A plurality of shorts 2 are arranged in columns and rows in the emitter 4. Emitter 4 is surrounded by a circular gate 6. Shorts 4 are used in controlled rectifiers to short part of the junction between the emitter and base regions for reasons having to do with injection efficiency of the emitter, turnoff by moderate control signals, stability of the breakover voltage at higher temperatures, etc. However, the conventional rectangular short pattern of the prior art shown in FIG. 1 has been found to have several disadvantages. To avoid shorting out the periphery of the circular emitter which would make it difficult to fire the rectifier, some shorts at the periphery must be eliminated. This is obvious from the rectangular pattern shown in FIG. 1. The elimination of some shorts from the periphery of an emitter of a given size results in a higher resistive path under the emitter to the shorts in the affected areas which results in a loss in the "dv/dt" capability of the rectifier, that is, its susceptibility to turn on by a rapid rate of rise in the applied forward blocking voltage.

Figure 2:
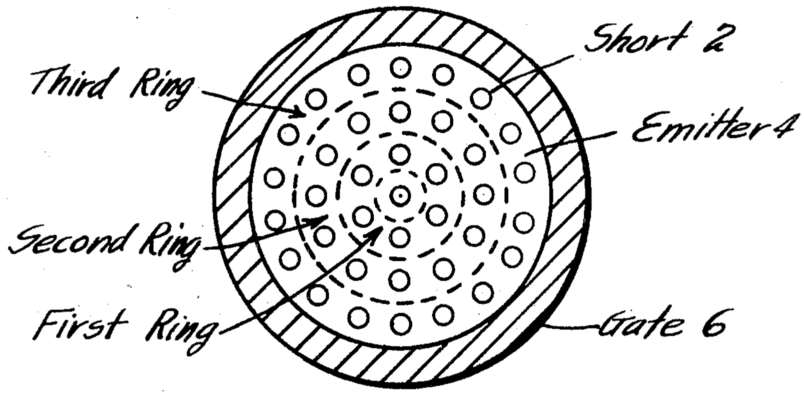
FIG. 2 shows the configuration of shorts in an emitter contact taught by the invention.

The invention, as shown in FIG. 2, overcomes the described problems of the prior art. The possibility of a mismatch at the emitter periphery is eliminated by the arrangement of the shorts 2 in the emitter 4 of FIG. 2. Here the shorts 2 are arranged in a plurality of concentric rings, such as the rings shown bounded by dotted lines, and labeled first, second, and third. Analysis has shown that, in order for the shorts 2 to be placed equidistantly in a short patten with circular symmetry, the shorts should be placed in rings wherein the number of shorts on the *n*th ring is 6*n*. Therefore, the first ring of FIG. 2 contains six shorts, the second ring contains 12 shorts, and the third ring contains 18 shorts. Additional rings, if required, would contain a proportionate number of shorts.

By use of the invention, controlled rectifiers can be built with a predictable performance with a forward voltage drop and gate current and voltage nearly equal to that of an unshorted controlled rectifier, with a better breakover characteristic at elevated temperatures, and without the aforementioned disadvantages of a rectangular pattern of shorts. The design permits more latitude in selecting a desired number of shorts to attain desired characteristics in the rectifier without adversely affecting other characteristics. The symmetrical design makes for easier fabrication, particularly with highly automated fabricating equipment.

What I claim is:

1. In a silicon controlled rectifier having a major surface with a peripheral annular base region contact thereon and a plurality of base-emitter junction contact shorts on said major surface within said base contact, the improvement comprising:
   a circular arrangement of said base-emitter junction contact shorts wherein said shorts are contained in a plurality of concentric rings surrounding a centrally located short on said major surface, the number of shorts in each ring being such that the *n*th ring contains 6*n* shorts, the shorts in each ring being located an equal distance from said peripheral base contact and an equal distance from the nearest two shorts in the same ring, the distance between the centrally located short and the first ring and between successive rings also being equal.